United States Patent Office 3,112,741
Patented Dec. 3, 1963

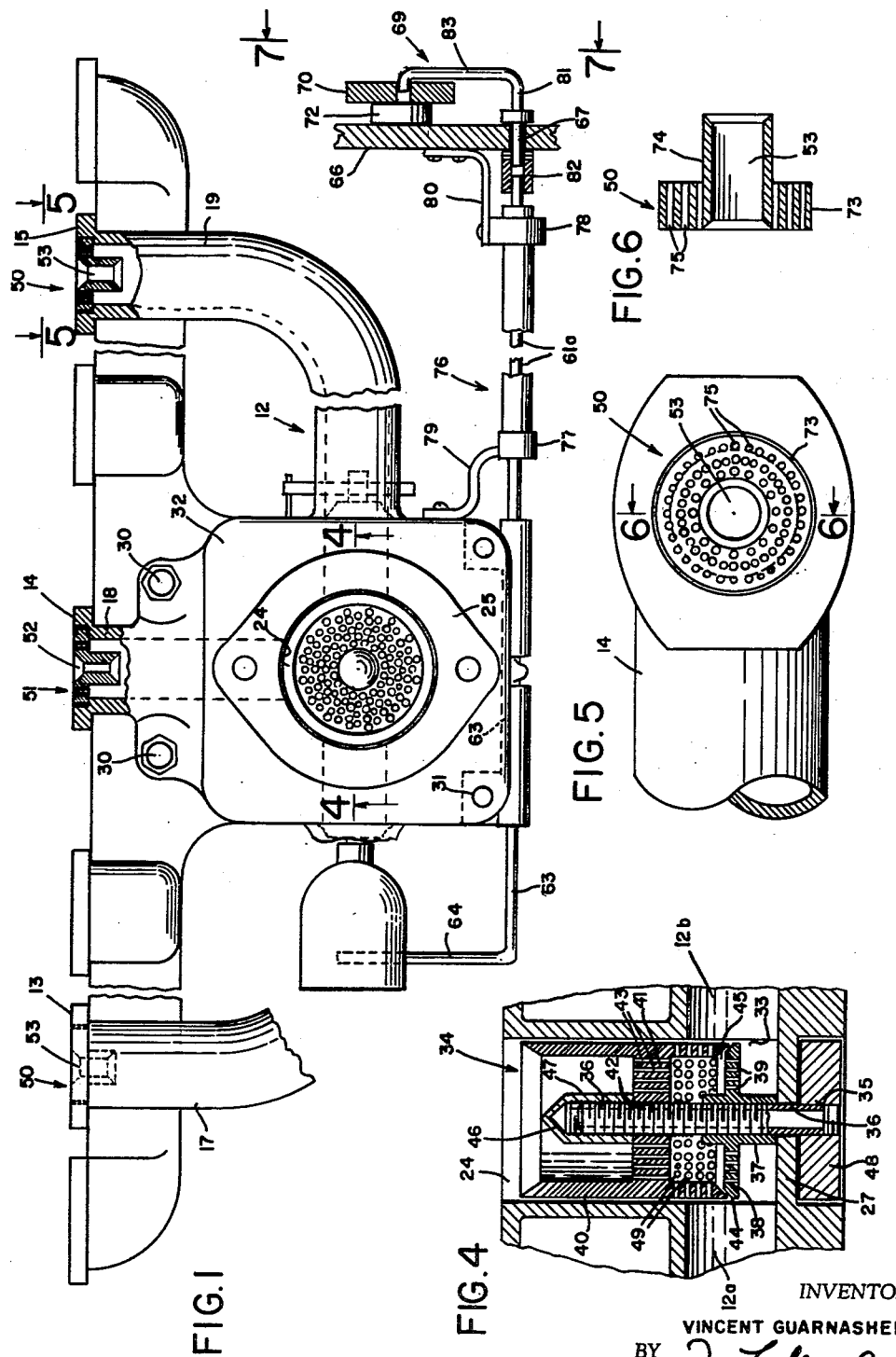

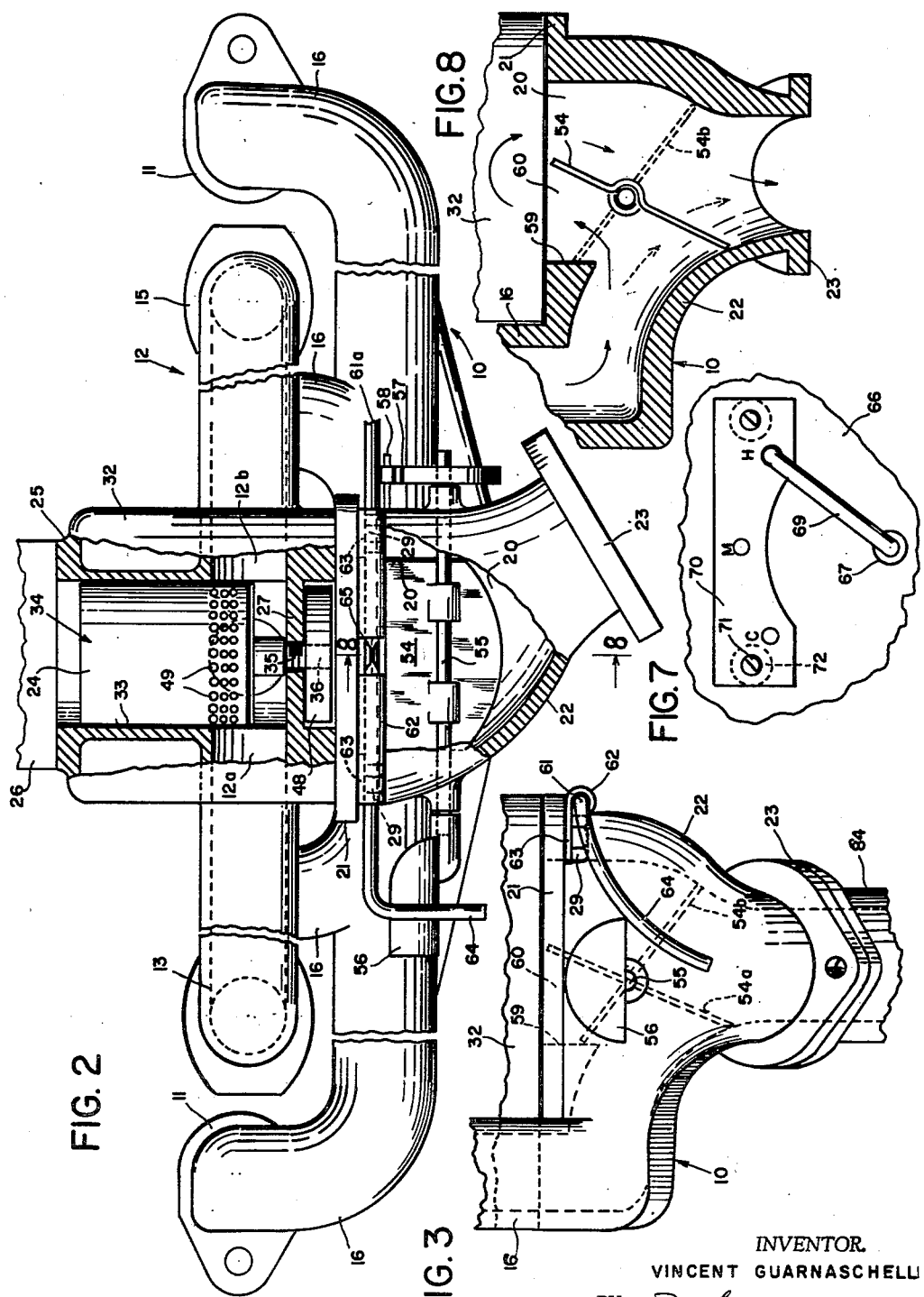

3,112,741
MEANS FOR INCREASING FUEL EFFICIENCY
IN INTERNAL COMBUSTION ENGINES
Vincent Guarnaschelli, 31 Alton Ave., Greenlawn, N.Y.
Filed Nov. 7, 1961, Ser. No. 150,694
12 Claims. (Cl. 123—122)

This invention relates to internal combustion engines and more particularly to automotive internal combustion engines.

A primary object of the invention is the attainment of more efficient fuel utilization so that increased power may be obtained for a given fuel consumption or a given power output may be obtained at a substantially lower rate of fuel consumption.

A further object of the invention is the provision of adjustable means whereby the heat available from the exhaust manifold to heat the combustible mixture discharged from the carburetor into the intake manifold may be regulated accordingly as more or less heat is desired. For example, on a hot or warm day when the vehicle is in a slow moving line of traffic, under which conditions many engines overheat, it is desirable that the exhaust heat directed to the carburetor discharge compartment be reduced to prevent such overheating. Contrariwise, on cold days when the vehicle is not subject to much idling, the carburetor output mixture should be supplied with a maximum of exhaust heat. This is also often the case in starting a cold engine, particularly in cold weather.

Fuel efficiency is generally reduced owing to the cooling of the fuel mixture in its passage from the carburetor to the cylinders. Condensation of a portion of the fuel in the mixture on its way to the cylinders reduces the proportion of fuel in the mixture below that set by the carburetor adjustments, as is well known. In an effort to supply more heat to the carburetor discharge compartment, it has become common practice to provide means for directing against the compartment a constant amount of heat created in the exhaust manifold. This practice is not undesirable in cold weather, but under dense and slow-moving traffic conditions this often results in overheating an engine which otherwise might not overheat as quickly.

It is therefore a further object of the invention to provide means for adjusting the rate of heat flow to the carburetor discharge compartment, and further to provide such adjusting or control means in a form such that the adjustment may readily be made by the driver from within the vehicle at the instant that he believes such adjustment desirable, whether to lower the rate of such flow or to increase it.

Such internal combustion engines are commonly so constructed that the length of manifold conduit or pipe leading to the middle cylinder or cylinders of a block is shorter than the length of the pipes leading to the outer or end cylinders. Consequently more condensation takes place in the pipes leading to the outer cylinders than in those which lead to the middle cylinders.

It is therefore a still further object of the present invention to provide means which tend to reduce the quantity of fuel which enters the middle cylinder or cylinders compared with the quantity which enters the outer or end cylinders of a block, while at the same time tending to add heat to the mixture just before it enters all of the cylinders.

Yet another object of the invention is the provision of a novel and improved adjustable insert adapted to be mounted in the carburetor discharge compartment or chamber not only for adding heat to the discharged fuel mixture but also to permit of adjustment of the discharged fuel mixture between a range in which it is discharged into the cylinders as a spray of finely divided and thoroughly mixed combustible fuel and a range in which the mixture is in the form of a widespread fine mist. The adjustable insert provides a combination of heat application to the mixture together with a high degree of turbulence to the molecules of air and fuel.

The above as well as additional objects will be clarified in the following description wherein reference numerals refer to like-numbered parts in the accompanying drawing. It is to be noted that the drawing is intended primarily for the purpose of illustration and that it is therefore neither desired nor intended to limit the invention necessarily to any or all details shown or described except insofar as they may be deemed essential to the invention.

Referring briefly to the drawing, FIG. 1 is a fragmentary top plan view, with parts broken away and partly in section, of the combined castings of the intake manifold and the exhaust manifold as they appear when mounted on an engine, not shown, together with the adjustable means for controlling the heat flow by the driver from the exhaust manifold into the carburetor discharge chamber and including the insert and the heating members which simultaneously control the quantity of flow of fuel mixture to the various cylinders.

FIG. 2 is a side elevational view of the same, with parts broken away and partly in section, showing also fragmentarily a representation of the carburetor of the engine.

FIG. 3 is a fragmentary elevational view of the end and lower middle portion of FIG. 2 as seen from the left-hand end of FIG. 2.

FIG. 4 is a sectional view taken on the line 4—4 of FIG. 1.

FIG. 5 is an enlarged view taken on the line 5—5 of FIG. 1.

FIG. 6 is a fragmentary sectional view taken on the line 6—6 of FIG. 5.

FIG. 7 is a view taken on the line 7—7 of FIG. 1, showing also a portion of the dashboard of the vehicle.

FIG. 8 is a sectional view taken on the line 8—8 of FIG. 2.

Referring briefly to the drawings, the numeral 10 indicates the exhaust manifold of the engine which, in the example illustrated, would be a six-cylinder engine which, as is well known, has four exhaust ports connected to the four flanged unions or terminal ends of the manifold 10, indicated at 11. The usual intake manifold 12 for such an engine has three intake ports to the cylinder block, these ports being connected to the three flanged unions or terminal ends 13, 14 and 15, the terminals 13 and 15 leading into the outermost pairs of cylinders and the terminal 14 leading to the innermost or middle cylinders.

The exhaust manifold 10 has curved branches 16 on whose extremities the flanges 11 are provided, and the intake manifold has branches 17, 18 and 19 on whose ends, respectively, the flanges 13, 14 and 15 are provided.

Intermediate the length of the exhaust manifold 10 a chamber 20, open at the top and provided with a flange 21, is formed integral with the exhaust manifold casting. This chamber is also open at the bottom and the housing 22 which encloses it terminates in a flange 23 connected to the exhaust pipe 84, shown leading to the usual muffler, not shown. The top of this housing and the flange 21 are substantially rectangular in outline.

Intermediate the length of the intake manifold there is likewise an integrally cast complementary rectangular housing 32 having a cylindrical opening 24 downward thereinto surrounded at the top by a flange 25 to which the carburetor, shown only schematically at 26, is attached to discharge into the passage 24. The housing 32 has a floor 27 raised somewhat above the lower end of the vertical surrounding housing wall to provide a clear space 28. Bolts such as shown at 29 are passed through holes 30 and 31 in the housing 32 and complementary holes, not shown, in the housing 22 to secure the two housings together in the usual manner.

The housing 32 encloses a cylindrical chamber 33 of the same diameter as the passage 24, terminating in the floor 27. Diametrically opposed passages 12a and 12b lead from the bottom of the chamber 33 in opposite directions into the intake manifold in the well known manner substantially as illustrated.

A high heat conducting metallic insert 34 is mounted in the chamber 33. An axial opening 35 is provided through the floor 27, and an elongated hollow stem or tube 36 extends downward through this opening. Sweated or otherwise secured on this stem at a position nearer but spaced from the lower end thereof is a sleeve 37 of larger diameter than the opening 35, and on the sleeve between its upper and lower ends is a flange 38 having perforations 39 extending therethrough. A cylindrical shell 40, open at the top, has a horizontal partition 41 which is, substantially as shown, relatively thicker than the flange 38. A threaded axial passage 42 extends through the partition 41, through which the stem 36 extends in threadable engagement. The partition 41 is also provided with perforations or passages 43 therethrough. The diameter of the shell 40 and of the flange 38 is just very slightly less than the diameter of the chamber 33 so that little movement of gases is permitted between the shell and the chamber wall and yet the cylinder may be readily rotated by hand. Complementary circumferential bevels 44 and 45 are provided on, respectively, the flange 38 and the lower edge of the shell 40. An internally threaded elongated hollow cap 47 provided with a tapering or conical tip 46 screws down upon the partition 41 to lock the latter in the desired vertical position. All of the parts of the insert 34 just described are preferably made of aluminum or an aluminum alloy.

A threaded washer or nut, shown at 48 cylindrical in form, screws on to the extremity of the stem 36 which projects below the floor 27, and thus the insert 34 is maintained securely in position. The lower portion of the shell 40, that is the portion below the partition 41, has a circumferential belt of perforations 49 therethrough. The nut 48 is preferably made of copper.

It is obvious from FIG. 4 that the shell 40 may be raised or lowered with respect to the flange 38, from an extreme low position wherein their respective beveled edges are in mutual contact to an extreme upper position in which a substantial circumferential passage is provided between the said edges. In practice, however, a separation of about one sixty-fourth of an inch between the beveled edges is the minimum spacing, and this distance is increased as desired or, subsequently, decreased as desired.

Assuming that the shell 40 is in its lowered position mentioned above, intake mixture entering the chamber 33 from the carburetor passes into the shell 40. A portion of this mixture exits through the perforations or pores 49, another portion passes in a circumferential spray of mist through the space between the bottom of the shell and the flange 44, and another portion passes downward through the pores 39 in the flange 38. It is to be noted that all of the mixture descending into the shell exits from the insert within the upper and lower confines of the passages 12a and 12b and is thus discharged from the insert at a position where it is readily available to be sucked into the inlet passages to the cylinders of the engine. The entire insert is of course hot under normal conditions while the engine is running following a brief interval of starting the engine.

Under normal relatively warm weather conditions the shell 40 is maintained in the lowermost position mentioned above or close thereto. Under colder weather conditions an adjustment is made to provide a more concentrated mixture into the engine cylinders, by raising the shell 40 to increase the space between the beveled edges of the shell and the flange. After such adjustment the greater part of the mixture will pass between the said beveled edges and thus supply an increased power mixture to the cylinders.

Under all conditions the mixture in passing through the perforations 43, 49 and 39 as well as between the shell and the flange 38, is subjected not only to the heat of the insert to keep the mixture from condensing but also to having its turbulence greatly increased. The combination of these two circumstances brings about a condition in the fuel mixture wherein the molecules of fuel are finely spread about or mixed with the molecules of air, for maximum efficiency of combustion.

In order to overcome the common condition wherein the remote cylinders receive a lesser concentration of fuel in the mixture than do the cylinders closer to the carburetor or the chamber 33, the following means is provided. As the terminal ends of the inlet manifold pipes 17, 18, and 19, FIG. 1, plugs 50, 51, and 50, respectively are mounted, substantially as shown. These plugs are also made of high heat conducting material such as, for example, aluminum or an aluminum alloy. The plug 51 has an axial passage 52 therethrough, and the plugs 50 have axial passages 53 therethrough of equal diameters which are larger than the diameter of the passage 52 in the plug 51. This arrangement reduces the flow of mixture into the middle engine cylinders with respect to the flow into the remote cylinders and thus tends to equalize the power output of all of the cylinders. At the same time as the mixture reaches the end of the inlet manifold pipe just before entering a cylinder, the hot plugs 50 and 51 tend to increase the heat of the mixture as normally the mixture is subject to some cooling in passing from the chamber 33 to the various cylinders. The plugs thus give a boost to the combustible quality of the mixture just before it enters a cylinder.

By the utilization of the insert 34 alone, and with the shell adjusted and locked by the cap 46 in the proper position determined by the particular driving and weather conditions, the efficiency of combustion is increased so substantially that the diameter of the carburetor jet may be reduced from the normal .062 inch in a given standard automobile to as little as .043 inch and yet maintain the same power output and mileage or even increase the same, other things being equal. Further, with the reduced jet diameter the same or better acceleration, speed and general performance are obtained.

It is common practice to provide some of the means shown in FIGS. 2, 3 and 8 to direct hot exhaust gases against the bottom of the housing 32 (which encloses the chamber 35) prior to its passage into the exhaust pipe, to heat the intake mixture discharged into this chamber from the carburetor. The means commonly used for this purpose consists of a shutter 54 pivotally mounted on a rod 55 which extends across the chamber 20 and through the walls of the enclosing housing 22. On one end of this rod there is a semi-cylindrical balancing weight 56, and on the other end there is a coiled spring 57 having one end attached to a lug 58 on the housing 22 and the other end attached to the rod 55. The tension of the spring 57 normally maintains the shutter in the position shown in broken lines at 54a in FIG. 3, that is, to direct the exhaust gases from the manifold 10, which enter the housing 22, upward through the space 60 between the casting edge 59 and the top of the shutter. This is more clearly shown by the shutter 54 in full or solid lines in FIG. 8. Thus, before the exhaust gases pass through the opening within the flange 23 into the exhaust pipe, they are entirely confined to passing under the flow 27 of the chamber 33. The direction of flow of the exhaust gases under these circumstances is indicated by the solid arrows in FIG. 8.

With this standard structure, the shutter remains in the position just described at all times except when there is a sufficiently high pressure of the exhausts from a cylinder or cylinders to force the shutter to swing counter-clockwise, FIGS. 3 and 8. This occurs only intermittently and for a very brief interval of time, so that in use, as when the motor is being rapidly accelerated, the shutter at best flutters. As a consequence of this directing all of the exhaust gases into contact with the housing 32 practically all of the time, in warm or even moderately warm weather, and even in cold weather when the vehicle is caught in a bumper-to-bumper slow or intermittently moving traffic, the engine is subject to overheating.

To overcome these undesirable features, the instant invention includes the following improvement. An elongated rod 61 is rotatably supported in a sleeve 62 formed by rolling one edge of a plate into a cylindrical sleeve, the sleeve being secured on the outside of the housing by clamping the plate 63 between the heads of the bolts 29 and the flange 21. The forward end of the rod 61 has an arcuate extension 64 extending generally inward and downward, as illustrated in FIG. 3, with its convex side toward and either in contact with the lower adjacent edge of the weight or enlargement or projection 56 close to the same. At its other end the rod 61 has coupled thereto the resilient core or wire 61a of a flexible cable 76 which may be supported in bearings 77 and 78 on suitable brackets 79 and 80, the former attached to the housing 32 and the latter to the dashboard or other suitable panel or partition 66 separating the driver from the engine. A U-shaped resilient member which may be a bent rod 69 includes an arm 81 extending through an opening 67 in the dashboard and coupled at 82 to the core 61a of the cable 76. The member 69 includes a crank 83 which extends upward in front of the dashboard and on its extremity there is a right angle deformation or tip 68 extending forward toward the dashboard. A panel 70 is secured to the board 66 by screws 71 or the like, or by other means, with soft or sponge rubber spacer washers shown at 72 surrounding the screws between the parts 66 and 70. This panel is shown having three holes or recesses therein, one being labeled C for cold at one end, another H for hot at the other end, and a third labeled M for medium between the other two, or other suitable spacing of the holes or other indicia may be provided. The washers or spacers 72 permit of limited yieldable movement of the panel toward the dashboard. As the member 69 is unitary and made of somewhat yieldable material so that it possesses a degree of springiness, it is obvious that the crank 83 will be bent toward him when the driver pulls the upper end outward to extricate the tip 68 from whichever of the holes in the panel in which the tip is registered. The driver may then swing the crank to position the tip for registration in another of the holes. The compressibility of the spacers 72 permit this operation to be performed more easily.

It is apparent that by the means just described the driver may vary the position of the shutter 54 in the housing 22. The fixed relationship between the shutter and the weight 56 is such that the spring 57 normally holds the shutter in the position shown at 54a in FIG. 3, that is, with the full heat of the exhaust gases diverted to contact the housing 32. In this normal position of the shutter the weight 56 on the shutter rod or shaft 55 is positioned as shown in FIG. 3, with the arcuate side of the weight facing upward and with the extension 64 of the rod 61 either in close contact with the adjacent edge of the weight or near thereto. When it is desired, for reasons previously mentioned, to reduce the heating of the housing 32 by the exhaust gases, the crank 69 is pulled out of the hole marked H in the panel 70, the crank is swung to the median hole marked M and released to let the tip 68 register therein. Or when, in hot weather or while idling with a hot engine or moving slowly or intermittently in traffic, it is desired to divert the exhaust heat entirely from the housing 32, the crank is moved to the position or hole C. In this position the exhaust gases from the manifold 10 follow the path indicated by the broken line arrows in FIG. 8 since the shutter is now in the position indicated at 54b in FIGS. 3 and 8. When the crank tip 68 is positioned in the hole marked M part of the exhaust gases are diverted upward against the housing 32 and the remainder downward directly into the lower end of the housing 22. Thus the driver can vary the degree of heating of the intake fuel mixture immediately when driving conditions call for less heat.

The combination of means and the mode of operation thereof illustrated and described above, provides an accurate and adjustable means not only for heating the intake mixture before and as it enters the cylinders of the engine but also for varying, adjusting or controlling the degree of heating desired depending upon the conditions under which the engine is being operated.

It is to be noted that each plug 50 and 51 consists of a neck portion which projects into the intake manifold conduit, as indicated at 74 in FIG. 6, and a flange portion 73 which is substantially flush with the extremity of the conduit. The circumferential edges of these flanges may be secured in position by any suitable means, either frictionally or by the use of a suitable cement or the like. The plugs 50 and 51 are identical except that the passage 52 through the neck 74 of the plug 51 is reduced, together with the diameter of the neck, compared with the same parts of the plug 50, the passage through the latter being indicated at 53. The flange portion 73 of the plugs is provided with a plurality of perforations or pores 75 through which a portion of the fuel mixture also passes. Thus the mixture is again heated, or heat from the plugs is added to it, just before it enters a cylinder.

While the invention has been described with particular reference to the accompanying drawing such is not to be construed as a limitation upon the invention which is best defined in the attached claims.

The invention having thus been described, what is claimed and desired to be secured by Letters Patent is as follows:

1. In an internal combustion engine having an intake manifold including a housing enclosing an upright cylindrical chamber open at the top upon which is mounted a carburetor to discharge fuel mixture into the chamber and below which is mounted an exhaust manifold housing to heat the chamber, the intake manifold further including conduits leading from said chamber to the engine cylinders, the improvement consisting in adjustable means for modifying the heating effect of exhaust gases in the exhaust manifold housing upon the fuel mixture discharged from the carburetor consisting in the provision of a high heat conducting metallic insert in said chamber and of adjustable means for varying the flow of exhaust gases under said chamber in said exhaust manifold housing in a range between complete flow of the gases against the bottom of the chamber and complete diversion of the gases away from the bottom of the chamber, and high heat conducting members mounted in said conduits at the junctions of the conduits with the engine cylinders.

2. An improvement according to claim 1, said last-named means including means for decreasing the volume of flow of intake mixture into the middle cylinders of the engine as compared with the volume of flow into the end cylinders.

3. In combination with an internal combustion engine having an intake manifold including an upright cylindrical chamber having a floor and open at the top upon which is mounted a carburetor to discharge fuel mixture into the chamber and below which is mounted an exhaust manifold housing to heat the chamber, the exhaust manifold housing having a relatively large opening at the top under said floor and a relatively smaller opening at the bottom leading into an exhaust pipe, the exhaust manifold housing having a substantially horizontal shaft extending therethrough and projecting from opposite walls thereof, a shutter rigid on said shaft within the exhaust manifold housing, resilient means normally maintaining the shutter to divert substantially all of the exhaust gases from the engine cylinders along a path extending upward on one side of the shutter into contact with said floor and thence downward on the other side of the shutter toward said smaller opening, the improvement consisting in means for rotating the shutter through a range between the normal position thereof and a position to divert substantially all of said exhaust gases directly toward said smaller opening without contacting said floor, said shaft having on one end thereof an extension disaligned with respect to the shaft, said means for rotating the shutter comprising a rod rotatably secured to the outside of the exhaust manifold housing substantially parallel with said shaft, said rod having one end thereof projecting beyond the confines of the exhaust manifold housing and having a portion of said end of the rod positioned substantially in a common plane with said shaft at right angles to the shaft, the rod having a projection thereon lying in said plane and extending into the arcuate path of movement of said extension for engagement with the extension upon rotation of the rod, and means for rotating the rod.

4. In combination with an internal combustion engine having an intake manifold including an upright cylindrical chamber having a floor and open at the top upon which is mounted a carburetor to discharge fuel mixture into the chamber and below which is mounted an exhaust manifold housing to heat the chamber, the exhaust manifold housing having a relatively large opening at the top under said floor and a relatively smaller opening at the bottom leading into an exhaust pipe, the exaust manifold housing having a substantially horizontal shaft extending therethrough and projecting from opposite walls thereof, a shutter rigid on said shaft within the exhaust manifold housing, resilient means normally maintaining the shutter to divert substantially all of the exhaust gases from the engine cylinders along a path extending upward on one side of the shutter into contact with said floor and thence downward on the other side of the shutter toward said smaller opening, the improvement consisting in means for rotating the shutter through a range between the normal position thereof and a position to divert substantially all of said exhaust gases directly toward said smaller opening without contacting said floor, said means for rotating said shutter comprising a rod rotatably mounted on said exhaust manifold housing substantially parallel with said shaft having one end thereof projecting beyond one of said opposite walls whereby portions of the shaft and the rod are positioned side by side, means partly on the shaft and partly on the rod on the side by side portions of the shaft and the rod for rotating the shaft upon rotation of the rod, and means for rotating the rod.

5. An improvement according to claim 4, said means for rotating the rod comprising a shaft extending from the other end of the rod, the end of said last-named shaft opposite said rod having a crank thereon, a rigid support remote from said housings, said crank being pivotally mounted in said support, said means for locking the shutter comprising a panel secured to said support and having a plurality of arcuately spaced recesses therein, the pivot point of the crank being positioned at the center of curvature of the arcuate curve through said recesses and the crank having a length equal to the radius of said curve, the crank having a tip on its extremity substantially at right angles thereto, the crank being positioned closely adjacent the plane of said panel, said tip being registrable selectively in any of said recesses depending upon the position of the crank, the crank being made of somewhat resilient material.

6. An improvement according to claim 4, said means for rotating said rod comprising a flexible shaft having one end thereof coupled to the other end of said rod, the other end of the flexible shaft having a crank thereon, a rigid support remote from said housings having the crank pivotally mounted therein, said means for locking the shutter comprising a panel on said support having a plurality of arcuately spaced recesses therein, the crank being positioned closely adjacent the plane of the panel and having a tip on its extremity extending substantially at right angles to the crank, the crank having a length equal to the radius of curvature of the arcuate path through said recesses and having its pivot axis at the center of said arcuate path through the recesses, the tip being registrable selectively in any of said recesses depending upon the position of the crank.

7. An improvement according to claim 6, having resilient compressible spacer members between the panel and said support whereby the panel is yieldably movable in the direction of the support when the crank is so positioned that said tip engages the panel between the recesses.

8. In an internal combustion engine having an intake manifold including a housing enclosing an upright cylindrical chamber open at the top upon which is mounted a carburetor to discharge fuel mixture into the chamber and below which is mounted an exhaust manifold housing to heat the chamber, the chamber having a floor provided with an axial opening therethrough, the intake manifold further including conduits leading from the lower portion of the chamber to the engine cylinders, the entrances from the chamber into the conduits being positioned in a common horizontal plane, the improvement consisting of a high heat conducting metallic insert in said chamber including an upright threaded tube having a sleeve rigid thereon of larger diameter than said opening and having its lower end positioned near but spaced from the lower extremity of the tube, the tube being mounted in said opening with the lower extremity thereof projecting below said floor and having means thereon for locking the tube to the floor, the sleeve having a perforated flange thereon spaced upward from the lower extremity thereof to position the flange substantially in the horizontal plane of the axes of said entrances, a cylindrical shell having a perforated partition therein provided with a threaded axial opening threaded on said tube above said sleeve, the diameter of the shell and the diameter of the flange being slightly less than the internal diameter of said chamber to provide a fit of the shell and the flange in the chamber which is substantially snug yet permits rotation of the shell, a threaded cap on the upper end of the tube adapted to be screwed down upon the partition to lock the shell in vertically adjusted position with respect to the flange and to seal the top of the tube.

9. An improvement according to claim 8, the portion of said shell lying below said partition having radial perforations therethrough.

10. An improvement according to claim 8, the lower circumferential edge of said shell and the circumferential edge of said flange being complementarily beveled, the bevels on the shell and the flange being frusto-conical in form.

11. An improvement according to claim 10, the means for locking the tube to the floor comprising a high heat conducting nut threaded upon the end of the tube which projects below said floor.

12. An improvement according to claim 8, said intake manifold conduits having in the ends thereof which lead into the engine cylinders high heat conducting metallic plugs having axial openings therethrough, the axial openings in the plugs remote from said chamber having a larger diameter than the axial openings in the plugs adjacent the chamber.

References Cited in the file of this patent
UNITED STATES PATENTS 2,259,480     Morris _____ Oct. 21, 1941
2,651,507     Heinecke _____ Sept. 8, 1953